Sept. 20, 1971  S. HERTELL  3,605,802
CHECK VALVE
Filed Oct. 29, 1969

Inventor
Siegfried Hertell
By Gennaro L Pacquale
Agent

United States Patent Office 3,605,802
Patented Sept. 20, 1971

3,605,802
CHECK VALVE
Siegfried Hertell, Kelsterbach (Main), Germany, assignor to International Telephone and Telegraph Corporation, New York, N.Y.
Filed Oct. 29, 1969, Ser. No. 872,219
Claims priority, application Germany, Nov. 2, 1968,
P 18 06 748.6
Int. Cl. F16k *15/06, 25/02*
U.S. Cl. 137—514.5   10 Claims

ABSTRACT OF THE DISCLOSURE

A check valve having a spring-loaded poppet held against an annular valve seat with means for damping the movement of the poppet in both opening and closing directions. The stem of the poppet moves in a blind bore, the bottom of which is connected to the downstream side of the valve by a restricted passageway to provide damping when the valve is opening. A damping element on the poppet head contacts the seat as the valve closes to force fluid out of an annular chamber behind the damper to provide damping in the closing direction.

BACKGROUND OF THE INVENTION

Field of the invention

The invention relates to check valves.

Description of prior art

Check valves which connect two ducts and allow free flow of fluid in one direction are known. One valve of this type consists of two parts each of them connected to one duct and both parts, forming a cylindrical body, are interconnected by a threaded coupling. This coupling has the shape of a valve seat and also provides a guide shaft which is stressed by a spring on one end. A valve disc having a rubber sealing element is screwed on the other end of the shaft, thus effecting the sealing against the valve seat.

Further, a check valve is known which can be installed in cylindrical pressure tanks, pipes or the like, comprising a cylindrical valve seat body adjusted to the diameter of the tank or the pipe, the valve body being arranged to move in the tank. The valve seat body is sealed from the walls of the tank or the pipe by the dished end of a gasket, a disc-shaped part of which seals the seat of the valve body.

A check valve is also known which has a guiding part for the movable piece consisting of a headpiece arranged across the valve opening at a distance from the valve seat and having on its corners legs to guide the movable piece. On the inner surface of the lower part of the legs, which are arranged perpendicularly to the headpiece, recesses are provided to receive a spring ring. This spring ring lies in an annular recess radially cut into the part of the valve seat which is embraced by the ends of the legs. The ends of the legs extend into an annular recess in the front face of the valve seat carrier, the recess encircling the valve seat. The cross section of the legs corresponds to the width of the annular recess.

German Pat. Nos. 664,789 and 1,021,219 show two of the prior art valves mentioned above.

SUMMARY OF THE INVENTION

It is an object of the present invention to provide a check valve of the type which can be installed in casings or ducts, which guarantees absolute sealing, which opens and closes very quickly, which is damped in its movement and which has a minimal resistance to flow.

A further object of the invention is to provide a check valve in which the elastic sealing material is moved out of the area of rapid flow when the valve is opened and pressed against the sealing surface when the valve is closed.

These and other objects of the invention are achieved by a check valve having a spring-loaded movable piece or poppet which is slidable in a blind bore. The end of the bore is connected to the downstream side of the valve by a choke bore. The head of the movable piece contacting the valve seat body contains a damping element which is movable within the headpiece. The damping element has an essentially cylindrical shape and is guided and held in an annular recess in the head of the movable piece, the chamber behind the damping element communicating through a choke hole with the chamber in front of the movable piece.

According to the invention, the closing side of the cylindrical damping element is provided with an annular chamfer which sits close on the valve seat body when the fluid passage is closed. The contact surface of the annular chamfer matches the outline of the seat surface of the valve seat body.

In a preferred embodiment there is an annular recess on the back side of the damping element. Between the surface of the headpiece on the closing side, the movable part and the annular recess, a sealing ring, preferably of synthetic rubber, is inserted in such a way that it sits close on the seat surface of the valve seat body when the fluid passage is closed. In order to keep the resistance to flow as low as possible, the valve seat surface as well as the surface of the head of the movable piece, the damping element and the top of the damping element locking screw have a tapered shape when the fluid passage is opened. Preferably, the guiding part for the movable piece is an axially symmetrical, e.g., cylindrical, body providing a plurality of bores arranged parallel to the longitudinal axis for the passage of fluid and having a central blind hole for guiding the movable piece. A spring is provided between the head of the movable piece and the front face of the guiding part to bias the movable piece in a closed direction.

DESCRIPTION OF THE PREFERRED EMBODIMENTS

Figure 1:
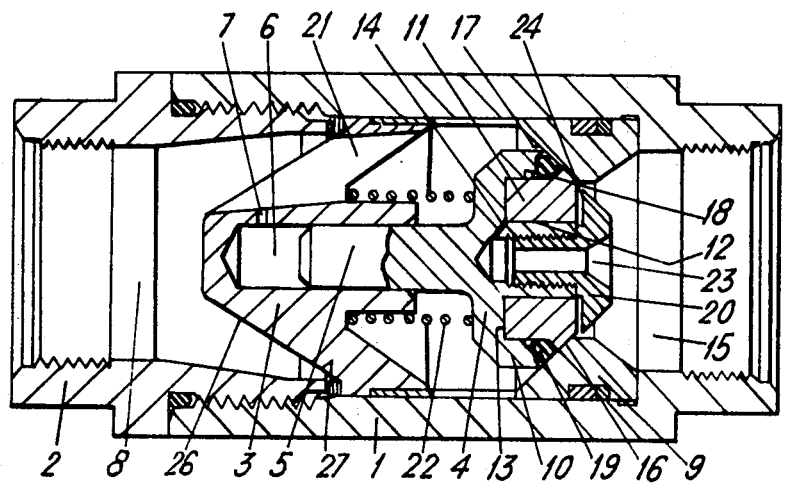
FIG. 1 is a longitudinal cross section of a check valve embodying the present invention in the closed position.
Figure 2:
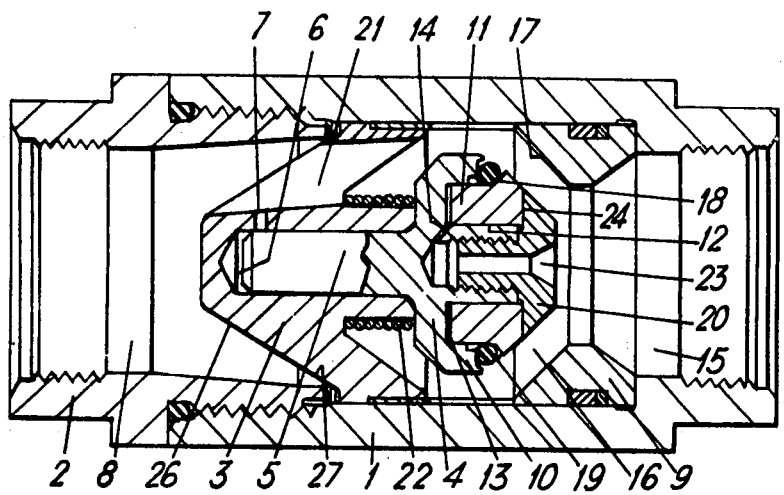
FIG. 2 is a longitudinal cross section of the check valve of FIG. 1 in the open position.

The check valve essentially comprises the two housing parts 1 and 2, the valve seat body 9, the guiding part for the movable piece 3 and the movable valve plug or poppet 4. The two housing parts 1 and 2 are screwed together, the valve seat 9 and the guiding part for the movable piece 3 being tigthly pressed against the housing part 1 and conventionally sealed.

The guiding part for the movable piece 3 is an axially symmetrical body having several bores 21 for the passage of the fluid and a centrally arranged blind hole 6 to support the shaft 5 of the movable piece 4. Between the movable piece 4 and the front face of the guiding part 3 a spring 22 is arranged to bias the movable piece 4 in the closed direction.

The movable piece 4 essentially comprises the headpiece 10 and the shaft or stem 5 which is held and supported in the blind hole 6 of the guiding part 3. On its front face, the movable piece provides an annular recess 12 into which the damping element 11 is inserted. A locking screw 20 limits the axial movement of the damping element. The front face of the damping element 11 is chamfered along the periphery on the closing end and sits with the chamfer on the valve seat body 9 when the valve is closed. A rubber sealing ring 19 is arranged between the damping element 11 and the headpiece 10 of the movable piece 4.

When the fluid flows into the check valve 1 from the right, the movable locking piece 4 with the damping element 11 and the sealing ring 19 move leftward in the opening direction against the force of the spring 22 after the opening pressure has been reached. If chamber 8 behind the check valve is also filled with fluid, then fluid which is in the blind hole 6 has to be displaced through the choke bore 7 during the opening of the valve. The degree of damping in opening direction depends on the distance, the damping chamber being throttled only shortly of the abutment, i.e., at first the valve opens very quickly. After the movable piece 4 has ended its stroke during the opening action, due to the dynamic pressure in front of the movable piece 4 the pressure increases in the annular chamber 13 via the bores 23 and 14, thus pressing the damping element 11 to the shoulder 24. In this way the space for the elastic ring 19 is enlarged so that the ring 19 contracts due to its initial stress to such an extent that it does not extend beyond the tapered surface 25 of the damper.

When the pressure drops on the right side of the check valve, i.e., in the chamber 15 in front of the movable piece 4, the force of the spring 22 and the pressure difference between the chamber 8 and chamber 15 quickly moves the movable piece 4 in closing direction to the right. In order to fully close, the fluid in the annual chamber 13 has to be pressed out through the choke bore 14, in this way dampening the closing movement of the valve. During the movement of the damping element 11 against the closing direction of the movable piece 4, the elastic ring located in the annular recess 18 is forced out of its position in such a way that it seals off the valve seat surface 17.

As shown in the drawing, the headpiece 10, the damping element 11, the locking screw 20 and the corresponding valve seat 17 have extremely smooth matching surfaces, the outlines on the closing side having a favorable shape in respect to the flow.

The check valve described above is particularly suitable for high pressure hydraulics and can be installed directly into pipelines or cylindrical pressure tanks without special reducing sockets. The surfaces of the movable piece 4 acted upon by the fluid may be designed in such a way that the valve can be closed and opened very quickly while still ensuring an excellent damping effect in both directions on the movement of the movable locking piece 4.

It will be appreciated that the invention illustrated and described herein may be modified by those skilled in the art without deviating from the spirit and scope of the invention as set forth in the following claims.

I claim as my invention:
1. A check valve comprising:
   a housing having an inlet passage, an outlet passage, a valve seat in a chamber between the inlet and outlet passages, and a blind bore, the bottom of the bore being connected to the outlet passage by a restricted passageway;
   a movable valve member having a stem slidably mounted in the housing bore for movement toward and away from the seat and a valve head attached to the stem;
   a spring biasing the valve member in the closed direction; and
   a damper slidably mounted within a recess in the valve head and adapted to contact the seat as the valve moves toward the closed position.
2. The check valve of claim 1 wherein a chamber formed between the damper and the valve head communicates with the main fluid flow path via a restricted passageway.
3. The check valve of claim 1 wherein the damper slidably mounted in the valve head has a thick-walled tubular shape and is movable in the recess in the valve head, and chamber formed behind the damper communicates with the inlet passage through a restricted passageway.
4. The check valve of claim 3 wherein the damper is chamfered at the same angle as the valve seat so that the damping element sits close on the valve seat when the valve is closed.
5. The check valve of claim 4 wherein an annular recess is formed between the damper and the valve head and a resilient sealing ring is inserted in the recess.
6. A check valve of the type having a poppet which is spring loaded against a valve seat, the poppet opening when the pressure differential across the valve exceeds a predetermined value, wherein the improvement comprises a blind bore in which the stem of the poppet moves, a restricted passageway connecting the bottom of the bore to the downstream side of the valve and a damper element slidably mounted within a recess in the head of the poppet and adapted to be actuated by contacting the seat as the valve moves toward a closed position.
7. The check valve of claim 6 wherein the damping element movable with respect to the head of the poppet has a cylindrical shape and is movable in an annular recess in the head of the poppet, and a chamber formed behind the damping element communicates with the upstream side of the valve through a restricted passageway.
8. The check valve of claim 7 wherein the cylindrical damping element is chamfered at the same angle as the valve seat so that the damping element sits close on the valve seat body when the valve is closed.
9. The check valve of claim 8 wherein an annular recess is formed between the damping element and the head of the poppet and a resilient sealing ring is inserted in the recess so that it sits on the seat surface of the valve when the valve is closed.
10. The check valve of claim 9 wherein the blind bore for guiding the poppet stem is a cylindrical body having a plurality of fluid passages arranged parallel to the longitudinal axis and the blind hole is formed in the center of the cylindrical body.

References Cited
UNITED STATES PATENTS

| | | | |
|---|---|---|---|
| 1,725,297 | 8/1929 | Paterson | 137—516.29 |
| 2,339,101 | 1/1944 | Parker | 137—514.5 |
| 2,341,018 | 2/1944 | Clapp | 137—516.29 |
| 2,927,605 | 3/1960 | Stephens | 137—514.5 |
| 2,962,039 | 11/1960 | Shand | 251—333 |

LAVERNE D. GEIGER, Primary Examiner
W. H. WRIGHT, Assistant Examiner

U.S. Cl. X.R.
137—514.3, 516.29